Jan. 30, 1923.
E. B. THORNHILL.
PROCESS OF PRODUCING SPONGE IRON.
FILED JAN. 8, 1920.
1,443,444.
2 SHEETS—SHEET 2.
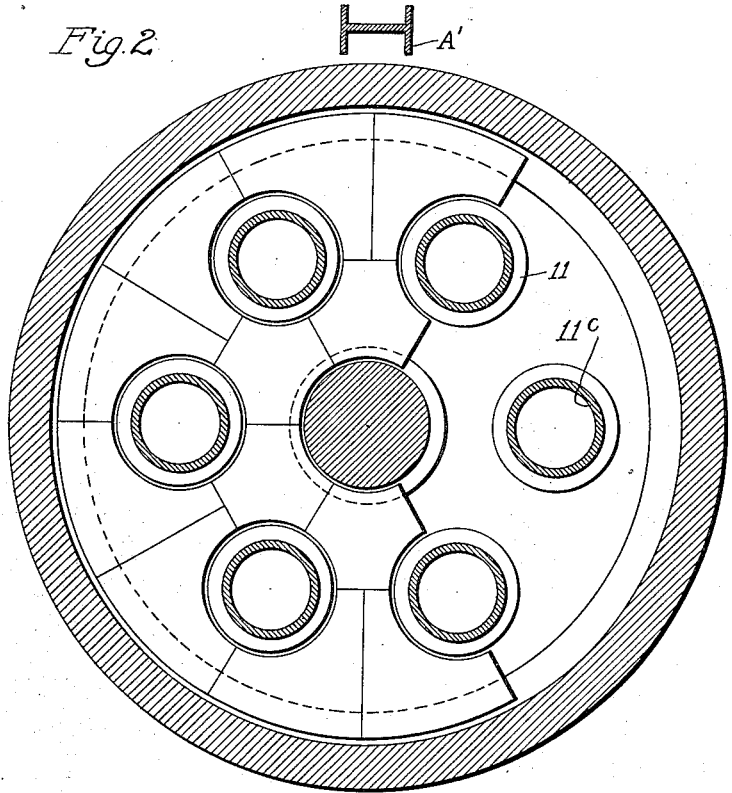
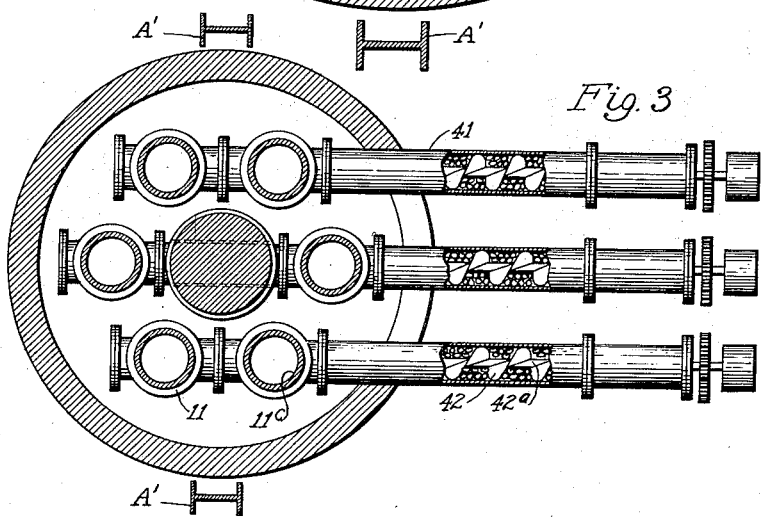
INVENTOR.
Edwin B. Thornhill
By Sheridan, Jones, Sheridan and Smith.
ATTORNEYS.

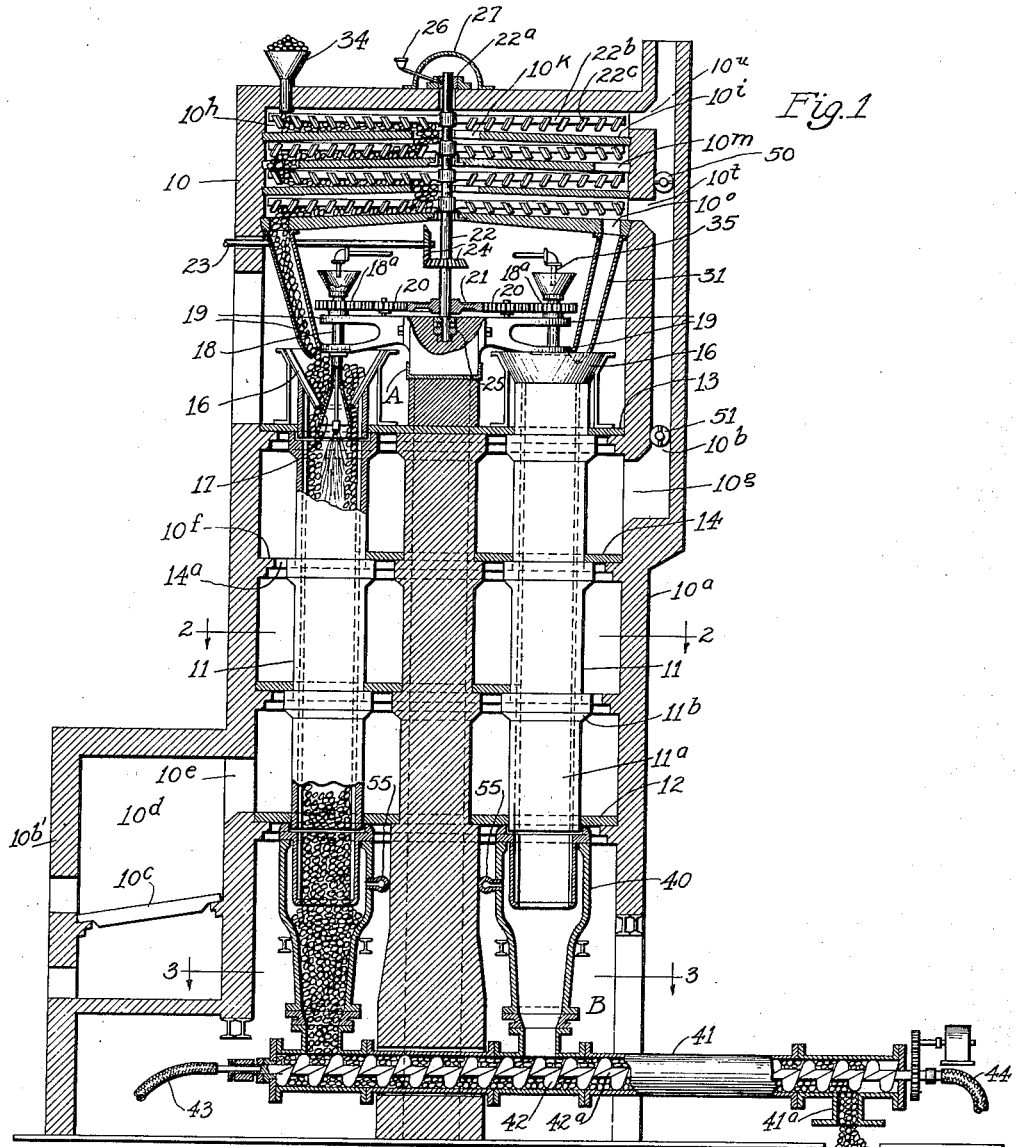

Patented Jan. 30, 1923.

1,443,444

UNITED STATES PATENT OFFICE.

EDWIN B. THORNHILL, OF HURLEY, NEW MEXICO.

PROCESS OF PRODUCING SPONGE IRON.

Application filed January 8, 1920. Serial No. 350,172.

*To all whom it may concern:*

Be it known that I, EDWIN B. THORNHILL, a citizen of the United States, residing at Hurley, in the county of Grant and State of New Mexico, have invented certain new and useful Improvements in Processes of Producing Sponge Iron, of which the following is a specification.

This invention relates to improvements in processes for producing sponge iron and has for its advantage to provide a new and improved process in which sponge iron, as it is termed, will be cheaply and efficiently produced and in a comminuted granular form. This sponge iron is of especial value in copper concentration, for example, where it is used in connection with leaching solutions to precipitate what I term amorphous copper, i. e., copper in the form of a flocculent precipitate, which can be readily recovered by flotation.

My process contemplates the reduction of the iron ore or "artificial" iron compound, such as $Fe_2O_3$, obtained by the calcining of natural ores, such as pyrites siderites, limonites and the like. The process is also especially adapted to the production of sponge iron from magnetite or hematite in their natural occurrence.

I have illustrated in the accompanying drawings and described in the following specification an apparatus to carry out my process. In the drawings—

Fig. 1 is a vertical section through a furnace, portions of the retorts and discharge tube being shown in elevation, the magnetic separating unit being shown diagrammatically.

Fig. 2 is a horizontal section along the line 2—2 of Fig. 1.

Fig. 3 is a horizontal section along the line 3—3 of Fig. 1.

Like numerals refer to like elements throughout the drawings in which 10 designates generally a furnace having the main vertical casing $10^a$ provided with a vertical flue $10^b$, the same constituting a chimney flue. At one side of the main casing $10^a$ at the bottom thereof is the furnace $10^b$ having the grate $10^c$ and fire box $10^d$, a passage $10^e$ leading from the latter to the interior of the casing $10^a$. It will be understood that I contemplate the use of any satisfactory heating means in lieu of the furnace shown. Located in the casing $10^a$ and spaced therefrom and from each other are a plurality of vertical retorts 11, each of said retorts being constructed of the sections $11^a$, each section having a socket or seat end $11^b$ in which seats the opposite end of the superimposed section $11^a$, as seen in Fig. 1. These retorts are preferably constructed of carbonaceous material, such as carborundum or other carbon refractory, and have a lining of carbon, such as graphite, indicated by numeral $11^c$ for a purpose to be hereinafter described.

Closely fitting the retorts 11 at the bottom of the casing $10^a$ is the plate 12 and the corresponding cover plate 13 is provided at the top of the section of the casing $10^a$. Intermediate the plates 12 and 13 are provided horizontal baffle plates 14 supported upon suitable ledges $10^f$ projecting inwardly from the casing $10^a$, these baffles 14 being constructed to provide suitable circulation apertures $14^a$, such openings being preferably staggered to insure thorough circulation of the heating gases around the retorts 11. A duct $10^g$ leads from the interior of the casing $10^a$ to the chimney duct or flue $10^b$.

At the upper ends of the retorts 11 are provided conical charging hoppers 16 with which coact rotable frustro-conical distributors 17 carried by the tubular shafts 18. These shafts are suitably journalled in the bracket bearings 19, which in turn are suitably supported upon the pedestal A forming in effect a core of the furnace casing $10^a$. Gears $18^a$ carried upon the tubular shafts 18 transmit rotation thereto, being in turn actuated by the idler gears 20 and the drive gear 21 carried upon the rabble shaft 22, to which rotation is transmitted through the medium of a drive shaft 23 and coacting bevel gears 24. This rabble shaft 22 is shown as supported by the step or thrust bearing 25 of conventional construction and suitably journalled at its upper end at $22^a$, to which bearing lubricant is transmitted by means of a lubricating cup 26, or the like, extending through the cap 27 which protects the upper end of the shaft 22, see Fig. 1. Located above the casing $10^a$ and constituting in effect an extension thereof is the preheating or calcining chamber $10^h$ having the shelves $10^i$ shown as convexed, as viewed from above. A suitable charging hopper or funnel 34 extends through the top of the chamber $10^h$ to a point above the uppermost shelf $10^i$, the latter being provided with a central aperture 10$^k$ through which material can be discharged upon the next lower shelf 10$^i$, the latter being provided with discharge openings 10$^m$ at its outer periphery, the next lower shelf 10$^i$ having the central aperture similar to that of the uppermost shelf, the lowermost shelf 10$^i$ having discharge openings 10$^o$, which communicate with spouts 31. These spouts extend to the hoppers 16 into which they are intended to discharge, as will be more fully explained in the description of my apparatus. Carried by the rabble shaft 22 are the radial arms 22$^b$, each of said arms being provided with blades 22$^c$, the blades of each horizontal set of arms being properly inclined to move the material supported on the shelves or hearths to discharge openings of said shelves. In short, the blades of the uppermost rabble arms 22$^b$ are so inclined that, when the rabble shaft 22 is rotated in the proper direction, the material upon the uppermost hearth or shelf 10$^i$ will be advanced to and thereafter through the discharge opening 10$^k$ upon the next lowermost hearth. The blades of the rabble arm coacting with this hearth will be reversed in inclination with respect to those of the uppermost arms and will move the material outwardly upon the second shelf or hearth and so on. The feed tubes 35 are provided for each of the rotorts 11, such tubes extending through the hollow shafts 18 and terminating at the upper ends of the retorts 11, these tubes being provided to discharge reducing material, such as powdered coal, coke, hydrocarbon oil, or other rerducing agent.

The bottoms of the retorts 11 are provided with collection receptacles 40 preferably constructed of cast iron or some other material possessing rapid conductivity. These receptacles are in communication with horizontal discharge tubes 41 in which are provided screw conveyors 42 having the central hollow shaft 42$^a$ through which a cooling fluid, such as water, is circulated, being supplied at one end by the pipe or tube 43 and discharged at the other through the pipe 44. The discharge pipes 41 are provided with the discharge outlets 41$^a$ located above the magnetic separator units 45. The collection receptacles 40 and a proportion of the discharge pipes 41 are located in the chamber B, which is open to the outside atmosphere and which is in effect a cooling chamber, the temperature thereof being considerably less than that in the casing 10$^a$, as will be obvious. A neutral or reducing atmosphere obtains in the receptacles 40, however.

The magnetic separator unit comprises the conveyor belt 45$^a$ driven by the pulley 45$^b$ and extending partially around the magnetic drum or cobber 45$^c$ within which are located the magnets 45$^d$ excited by current passing through suitable feed wires 45$^e$ from the source of current 45$^f$. The action of this separating unit is well known and needs no further amplification herein save to state that iron particles passing therethrough will be subjected to the influence of the magnets 45$^d$ and drawn into the collection space 46, while the non-iron particles will be projected outwardly into the space 47.

The chimney 10$^b$ is provided with the ports 10$^t$ and 10$^u$ at the bottom and top thereof respectively, a rotatable damper 50 being provided in the flue between such ports and a similar damper 51 being provided in the flue 10$^b$ just above the port or by-pass 10$^g$. With the dampers in the position shown in Fig. 1 the heating gases will circulate around the retorts and flow upwardly through the chimney flue 10$^b$ through the port 10$^t$ into the space above the lowermost hearth 10$^l$ through the successive upper spaces provided by the upper hearths and finally flow into the chimney flue through the port 10$^u$. With this circulation of heating gas the hearths will be heated to a temperature sufficient to calcine material thereon, if so desired or to preheat such material, if desirable. If it is not desired to preheat or calcine the material, the damper 50 may be opened to permit direct upward flow of the heating gases after leaving the retort spaces. During the reduction of the ore, gases are evolved which are capable of use either in the carrying out of my process or for heating such as carbon monoxide and I find it advisable to collect such gas as a by-product and for that purpose I have provided collection pipes 55 in communication with the interior of collection receptacles 40 to provide an outlet for the discharge and subsequent collection of such gas from the retorts.

In the carrying out of my process, an oxide of iron, either in a natural or artificial state, is fed through the hopper or funnel 34 onto the uppermost hearth 10$^l$ and passes over successive hearths during which travel it is preheated or calcined, as desired, and delivered to the hoppers 16 by means of the spouts 31. The rotating distributors 17 are so located with respect to the open bottoms of the hoppers 16 as to permit and assist the flow of the material into the retorts 11 in sufficient quantity to permit the showering or unimpeded drop through the retorts. A proper proportion of reducing agent, such as powdered coal, coke, hydrocarbon oil, or the like, is fed, preferably under pressure, through the tubes 35 at the top of the retorts. By constructing the retorts of proper height and maintaining the temperature in such retorts at the proper point for reduction, the reducing agent will act to deoxidize or reduce the iron carrying particles during the dropping or showering through the retorts. Little or no air is introduced with the charge to the retorts, and consequently the atmosphere therein will be favorable to reduction or deoxidation, as will be obvious. After the iron particles have become metallized or reduced in their passage through the retorts, they drop into the collection receptacles 40, being sufficiently cooled by that time to prevent agglomeration, and will drop through the receptacles 40 into the discharge tube 41 and be further cooled while discharged therefrom by the screw conveyor 42 by which they are deposited upon the conveyor 45ª of the magnetic separating unit and the pure iron particles are deposited in the collection space 46, while the non-iron particles of the materials are deposited into the collection space 47.

By properly comminuting the oxide particles the metallization thereof is almost instantaneous and the reduction described above, if carried on at a proper temperature, will result in the formation of small particles of pure sponge iron, which will cool below the agglomeration point during their passage through the collection receptacles 40 and will be further cooled below the temperature point at which oxidation readily occurs. By constructing my retorts with a lining of carbon, such as graphite, adhesion of the impinging metal particles to the sides of the retorts will be prevented since, while at the greatest point of heat during reduction, these particles will not adhere to carbon and consequent clogging of the retorts is prevented.

Should I desire to utilize sulphide ores of iron, such as pyrites, I calcine the same and thereby drive off the sulphur prior to reduction and I accomplish this by maintaining the heat in the preheating or calcining chamber at a proper point. Where naturally occurring oxides are used, such as hematite or magnetite, it is unnecessary to calcine the same, but I find it advantageous to preheat such ores to obtain greater rapidity of reduction and thereby to enable me to use retorts of considerably less height, thereby reducing the cost of the retort apparatus as well as expediting the carrying out of the process, which, as will be seen, is continuous.

It will be obvious that my process is capable of being carried out by apparatus other than that described above and it will also be obvious that such process is susceptible to modification and improvement and I do not wish to be restricted to the same as described except as defined in the appended claims.

What I claim is:—

1. A process of the class described consisting in showering particles of an oxide of iron and a reducing agent through a heated retort in a reducing atmosphere at a temperature proper to effectuate reduction of said oxide particles to sponge iron, thereafter cooling said iron particles during their showering travel to a temperature below that of agglomeration.

2. A process of the class described, consisting in showering particles of an oxide of iron and a reducing agent through a heated retort in a reducing atmosphere at a temperature proper to effectuate reduction of said oxide particles to sponge iron, thereafter cooling said iron particles during their showering travel to a temperature below that of agglomeration and further cooling said particles to a temperature below that of ready oxidation.

3. A process of the class described, consisting in showering particles of an oxide of iron and a reducing agent through a heated retort in a reducing atmosphere at a temperature proper to effectuate reduction of said oxide particles to sponge iron, thereafter cooling said iron particles during their showering travel to a temperature below that of agglomeration, further cooling said particles to a temperature below that of ready oxidation, and finally separating said iron particles from the non-iron particles.

In testimony whereof, I have subscribed my name.

EDWIN B. THORNHILL.